United States Patent
Singnurkar

(10) Patent No.: US 8,269,471 B2
(45) Date of Patent: Sep. 18, 2012

(54) METHOD FOR DC/DC CONVERSION AND DC/DC CONVERTER ARRANGEMENT INCLUDING FOUR SWITCHING PHASES

(75) Inventor: Pramod Singnurkar, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 795 days.

(21) Appl. No.: 12/087,292

(22) PCT Filed: Dec. 28, 2006

(86) PCT No.: PCT/EP2006/012571
§ 371 (c)(1),
(2), (4) Date: Apr. 17, 2009

(87) PCT Pub. No.: WO2007/073940
PCT Pub. Date: Jul. 5, 2007

(65) Prior Publication Data
US 2009/0251122 A1    Oct. 8, 2009

(30) Foreign Application Priority Data
Dec. 29, 2005   (EP) .................................. 05028681

(51) Int. Cl.
*G05F 1/24* (2006.01)
(52) U.S. Cl. .................. 323/259; 323/222; 323/271
(58) Field of Classification Search .................. 323/222, 323/223, 225, 268, 271, 282, 283, 285, 311, 323/312, 259
See application file for complete search history.

(56) References Cited

U.S. PATENT DOCUMENTS

| | | | |
|---|---|---|---|
| 4,837,495 A | 6/1989 | Zansky | |
| 4,975,820 A | 12/1990 | Szepesi | |
| 5,402,060 A | 3/1995 | Erisman et al. | |
| 6,037,755 A | 3/2000 | Mao et al. | |
| 6,069,807 A | 5/2000 | Boylan et al. | |
| 6,087,816 A | 7/2000 | Volk et al. | |

(Continued)

FOREIGN PATENT DOCUMENTS
EP          1388927 A2    2/2004
(Continued)

OTHER PUBLICATIONS

Mammano, B., "Current Sensing Solutions for Power Supply Designers", Texas Instruments Inc., Dallas, Texas, USA, 2001, p. 1-1 to 1-34.

(Continued)

*Primary Examiner* — Adolf Berhane
*Assistant Examiner* — Lakaisha Jackson
(74) *Attorney, Agent, or Firm* — Cozen O'Connor

(57) ABSTRACT

A method for DC/DC conversion which comprises the steps of controlling a first switch (10) for coupling a supply terminal (5) to a first terminal (60) of an inductor (2) and a second switch (20) for coupling the first terminal (60) to a ground potential terminal (8). The method further comprises controlling a third switch (30) for coupling a second terminal (61) of the inductor (2) to the ground potential terminal (8) and a fourth switch (40) for coupling the second terminal (61) to an output terminal (6). A control sequence is used to control the four switches (10, 20, 30, 40) using four switching phases (A, B, C, D). A maximum of two switches out of the four switches (10, 20, 30, 40) change their switching position at a respective transition of subsequent switching phases (A, B, C, D).

15 Claims, 4 Drawing Sheets

U.S. PATENT DOCUMENTS

| | | | |
|---|---|---|---|
| 6,166,527 A | 12/2000 | Dwelley et al. | |
| 6,246,222 B1 | 6/2001 | Nilles et al. | |
| 6,275,016 B1 * | 8/2001 | Ivanov | 323/224 |
| 6,717,388 B2 | 4/2004 | Smidt et al. | |
| 6,788,033 B2 * | 9/2004 | Vinciarelli | 323/225 |
| 6,930,526 B1 | 8/2005 | Silva | |
| 7,116,085 B2 * | 10/2006 | Ikezawa | 323/225 |
| 7,176,667 B2 * | 2/2007 | Chen et al. | 323/282 |
| 7,378,823 B2 * | 5/2008 | Yamanaka et al. | 323/267 |
| 7,466,112 B2 * | 12/2008 | Zhou et al. | 323/259 |
| 7,944,191 B2 * | 5/2011 | Xu | 323/259 |
| 2002/0190698 A1 | 12/2002 | Smidt et al. | |
| 2004/0046535 A1 | 3/2004 | Duffy et al. | |
| 2004/0090804 A1 * | 5/2004 | Lipcsei et al. | 363/41 |
| 2005/0093526 A1 | 5/2005 | Notman | |
| 2005/0110475 A1 * | 5/2005 | Chapuis | 323/282 |
| 2006/0284606 A1 | 12/2006 | Chen et al. | |
| 2007/0085519 A1 | 4/2007 | Xu | |

FOREIGN PATENT DOCUMENTS

| | | |
|---|---|---|
| EP | 1804368 | 7/2007 |
| WO | WO 2007/021282 | 2/2007 |

OTHER PUBLICATIONS

Mohan, N. et al., "Power Electronics: Converters, Applications and Design", ISBN 0-471-50537*4, John Wiley & Sons, p. 257, paragraph 8-8-6 and p. 651-652, 1989.

Tse, C.K. et al., "Control of Bifurcation in Current-Programmed DC/DC Converters: An Alternative Viewpoint of Ramp Compensation", Industrial Electronics Society, 26$^{th}$ Annual Conference of the IEEE, Oct. 22-28, 2000, Piscataway, NJ, USA, pp. 2413-2418.

"Modelling, Analysis and Compensation of the Current-Mode Converter", Unitrode Corp., Merrimack, NH, application note U-97, pp. 3-43 to 3-48, 1999.

B. Sahu et al., "A Low Voltage, Dynamic, Noninverting, Synchronous Buck-Boost Converter for Portable Applications", IEEE Transactions on Power Electronics, vol. 19, No. 2, Mar. 2004, pp. 443-452.

Gaboriault, M. et al.: "A High Efficiency, Non-Inverting, Buck-Boost DC-DC Converter"—Sep. 27, 2004, IEEE, APEC'04, 1411-1415.

* cited by examiner

FIG 2A

| SP1 | SP2 | Duration | Switching Phase | Switch |
|---|---|---|---|---|
| LOW | LOW | tp2 | A | 10, 40 on<br>20, 30 off |
| LOW | HIGH | td1 | B | 10, 30 on<br>20, 40 off |
| LOW | LOW | tp1 | C | 10, 40 on<br>20, 30 off |
| HIGH | LOW | td2 | D | 20, 40 on<br>10, 30 off |

FIG 2B

| SP1 | SP2 | Switching Phase | Switch |
|---|---|---|---|
| LOW | LOW | A | 10, 40 on<br>20, 30 off |
| HIGH | LOW | D | 20, 40 on<br>10, 30 off |

FIG 2C

| SP1 | SP2 | Switching Phase | Switch |
|---|---|---|---|
| LOW | LOW | A | 10, 40 on<br>20, 30 off |
| LOW | HIGH | B | 10, 30 on<br>20, 40 off |

US 8,269,471 B2

METHOD FOR DC/DC CONVERSION AND DC/DC CONVERTER ARRANGEMENT INCLUDING FOUR SWITCHING PHASES

RELATED APPLICATIONS

This is a U.S. national stage under 37 USC 3712 of application No. PCT/EP2006/012571, filed on 28 Dec. 2006.

This patent application claims the priority of European patent application no. 05028681.4 filed 29 Dec. 2005, the disclosure content of which is hereby incorporated by reference.

FIELD OF THE INVENTION

The present invention relates to a method for DC/DC conversion, a DC/DC converter arrangement and a use of the DC/DC converter arrangement.

BACKGROUND OF THE INVENTION

DC/DC converter arrangements are widely used for up-conversion of a supply voltage or down-conversion of a supply voltage to generate an output voltage for a circuit. For example, DC/DC converter arrangements are used in devices for mobile communication and digital cameras. DC/DC converters used for down-conversion are, for example, buck mode converters, whereas DC/DC converters for up-conversion are, for example, boost converters. If the supply voltage is nearly about the same as the output voltage, then DC/DC converter arrangements operating in a buck-boost mode can be used.

Document U.S. Pat. No. 6,717,388 B2 shows a buck converter with two switches and one inductor, a boost converter with two switches and one inductor, and a fly-back converter with two switches and one inductor.

Document U.S. Pat. No. 5,402,060 refers to a buck-boost converter with one inductor, two switches, and two diodes.

In the document by B. Sahu, G. A. Rincón-Mora, "A Low Voltage, Dynamic, Non-inverting, Synchronous Buck-Boost Converter for Portable Applications", IEEE Transactions on Power Electronics, Vol. 19, No. 2, March 2004, pp. 443-452, a buck-boost DC/DC converter having one inductor and four switches is presented. Two of the four switches are on during a first phase of a control cycle, while two other switches are on during a second phase of the control cycle. These two phases are repeated periodically.

SUMMARY OF THE INVENTION

It is an object of the present invention to provide a method for DC/DC conversion and a DC/DC converter arrangement having an improved degree of efficiency and having reduced peak currents.

A method for DC/DC conversion in accordance with one aspect of the invention comprises the steps of controlling four switches with a control sequence. A first switch is controlled which couples a supply terminal to a first terminal of an inductor. A second switch which couples the first terminal of the inductor to a ground potential terminal and a third switch which couples a second terminal of the inductor to the ground potential terminal are controlled. A fourth switch is controlled which couples the second terminal of the inductor to an output terminal.

The control sequence comprises at least four switching phases. A switch can have a closed switching position for conducting a current and can have an open switching position for preventing a current, alternatively.

It is an advantage of a DC/DC conversion having four switches that the amount of energy delivered to the inductor and the amount of energy that can be drawn from the inductor can be controlled in a flexible manner. It is a further advantage of a DC/DC conversion having a control sequence with four switching phases that high peak currents and fast changes of currents can be avoided. The harmonic content of an inductor current is reduced.

In an embodiment, a maximum of two switches out of the four switches change their switching position in a respective transition of subsequent switching phases.

The inductor may comprise a coil.

In a preferred embodiment of the present invention, a combination of switching positions comprises the switching positions of the four switches. One combination of switching positions corresponds to each of the four switching phases. A respective combination of switching positions is unique in three of the switching phases.

In an embodiment, the switching positions of the four switches during the first and the third switching phases are equal. The first and the third switching phases are only separated by a phase during which electrical energy is stored in the inductor. The third and the first switching phases are only separated by a phase during which electrical energy is unloaded from the inductor.

In an embodiment, the method for DC/DC conversion shows a non-intermittent operation. The operation may be a continuous operation in such a way that a flow of the inductor current is possible during all switching phases. In a preferred embodiment, the inductor receives energy or delivers energy in each of the four switching phases. According to this embodiment, there is no switching phase in which the inductor neither receives energy nor delivers energy.

It is preferred that none or one of the first and the second switch is in a closed switching position in each of the switching phases. Preferably, the first and the second switch are never closed at the same time. It is also preferred that none or one of the third and the fourth switch is in a closed switching position in each of the switching phases. The third and the fourth switch are never closed at the same time. It is an advantage of this embodiment that the supply terminal is not short-circuited to ground potential and that the output terminal is also not short-circuited to ground potential.

It is preferable that the first switch changes its switching position at least twice during a complete cycle comprising each of the switching phases. It is also preferred that the second, the third and the fourth switches change their switching position at least twice during a complete cycle, respectively. In this mode of operation, it is preferred that none of the four switches continuously remains in one switching position.

In a preferred embodiment, the first and the fourth switch are in a closed switching position and the second and the third switch are in an open switching position during the first switching phase. It is preferred that the first and the third switch are closed and the second and the fourth switch are open during the second switching phase. It is further preferred that the first and the fourth switch are closed and the second and the third switch are open during the third switching phase. The second and the fourth switch are closed and the first and the third switch are open during the fourth switching phase according to a preferred embodiment.

In an alternative embodiment, the second and the third switch are closed and the first and the fourth switch are open in the third switching phase.

In an alternative embodiment, the control sequence comprises more than four switching phases. The additional phases may be designed as short transition phases to arrange a smooth change-over.

According to an aspect of the invention, a DC/DC converter arrangement comprises four switches, an inductor, and a control circuit. The first terminal of the inductor is coupled to a supply terminal via a first switch and to a ground potential terminal via a second switch. A second terminal of the inductor is coupled to a ground potential terminal via a third switch and to an output terminal via a fourth switch. The control circuit is coupled to each of the control inputs of the four switches. The control circuit is designed to control the four switches by providing control signals to each of the four switches. Switch control is performed using a control sequence. The control sequence comprises four switching phases that are repeated periodically.

It is an advantage of the four switches that the storage of energy in the inductor and the supply of the energy in the inductor to an output load can be controlled flexibly and exactly. A high efficiency of energy consumption is achieved.

In an embodiment, a maximum of two switches of the four switches change their switching positions at a respective transition of subsequent switching phases. Preferable, this is true for every transition.

In an embodiment, the first switch is in a closed switching position during the first, second and third switching phase and in an open switching position during the fourth switching phase. On the other hand, the second switch is in a closed switching position during the fourth switching phase and in an open switching position during the first, second and third switching phase in this embodiment. According to this embodiment, the third switch is in a closed switching position during the second switching phase and in an open switching position during the first, third and fourth switching phase. However, the fourth switch is in a closed switching position during the first, third and fourth switching phase and in an open switching position during the second switching phase in this embodiment.

The four switches may be designed as bipolar transistors. However, it is preferred that the four switches are designed as field-effect transistors.

In a preferred embodiment, the first and the fourth switch are designed as p-channel field-effect transistors, while the second and the third switch are designed as n-channel field-effect transistors. In this embodiment the control inputs of the first and the second switch may be connected together. It is an advantage of this embodiment that the first and the second switch are not closed at the same time and, therefore, a short circuit of the supply terminal and the ground potential is avoided. According to this advantageous embodiment, the control inputs of the third and fourth switch can also be connected together, leading to an advantage that a short circuit of the output terminal to the ground potential is also avoided.

The control circuit may comprise logic gates and analogue circuit parts. The control circuit may comprise a central processing unit, CPU.

The control circuit may preferably be integrated monolithically. In alternative embodiments, the control circuit may be integrated monolithically together with the four switches. Bipolar circuit integration techniques may be used. Preferably, complementary metal-oxide-semiconductor integration techniques are used.

The DC/DC converter arrangement is preferably used in setups of mobile communication, in digital cameras or in laptop computers.

BRIEF DESCRIPTION OF THE DRAWINGS

FIGS. 2A to 2C show control sequences for different switching phases according to an example.

DETAILED DESCRIPTION OF THE DRAWINGS

Figure 1:
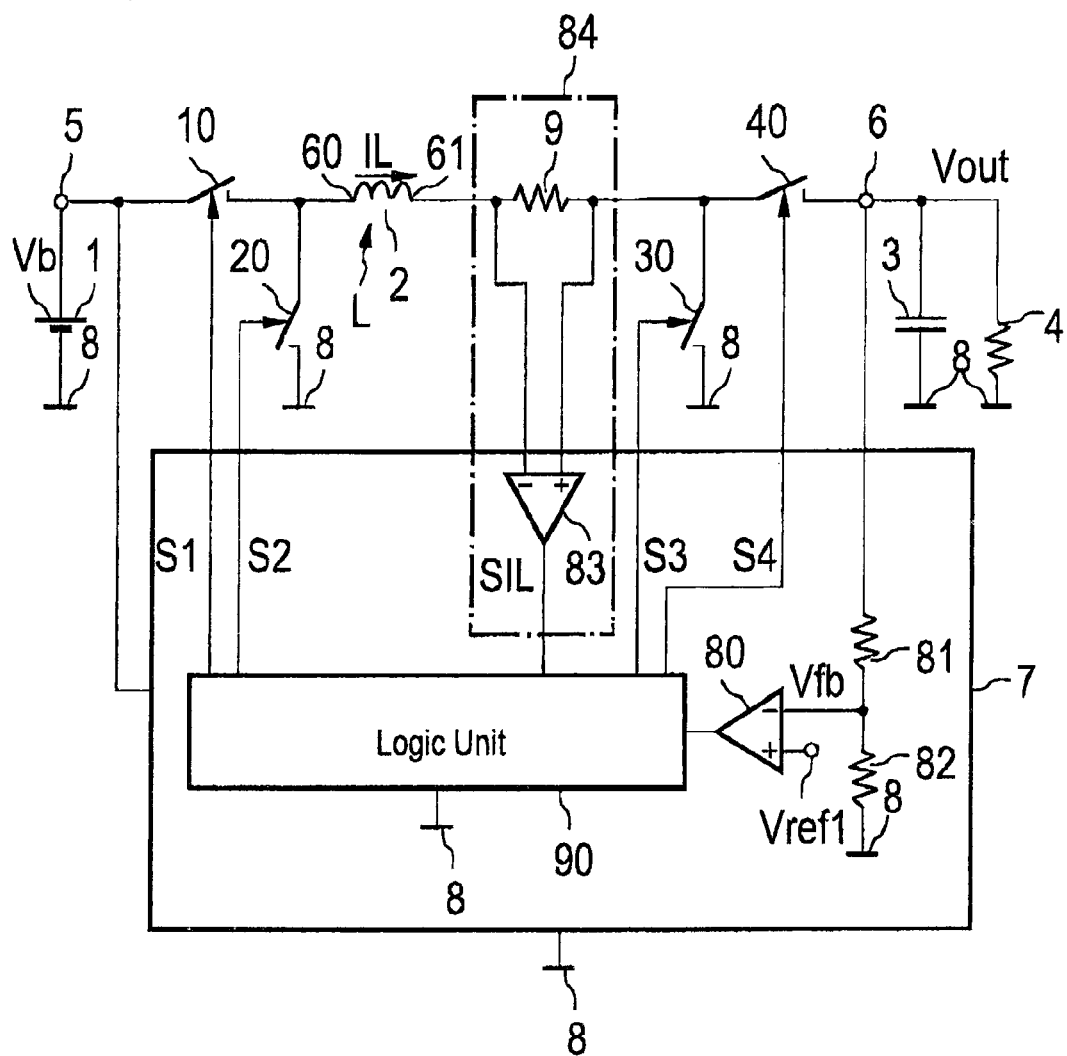
FIG. 1 shows a schematic of an exemplary embodiment of the invention.

FIG. 1 shows a schematic of a first embodiment of a DC/DC converter arrangement according to the invention. The DC/DC converter arrangement comprises a supply terminal 5 which is coupled to a first terminal 60 of an inductor 2 via a first switch 10. The first terminal 60 of the inductor 2 is coupled to a ground potential terminal 8 via a second switch 20. A second terminal 61 of the inductor 2 is coupled to a node over a resistor 9. This node is coupled to the ground potential terminal 8 via a third switch 30 and to an output terminal 6 via a fourth switch 40. The inductor 2, having an inductivity L, may be designed as coil.

A control circuit 7 is coupled to a respective control input of the four switches 10, 20, 30, 40. A first and a second terminal of the resistor 9 are connected to input terminals of the control circuit 7. The supply terminal 5 is connected to the control circuit 7. The control circuit 7 comprises a voltage divider 81, 82 which is connected to the output terminal 6 and to the ground potential 8. The control circuit 7 further comprises a first amplifier 80 with a first input terminal which is connected to an intermediate node of the voltage divider 81, 82 and with a second input terminal to which a reference voltage Vref1 is provided. The control circuit 7 further comprises a second amplifier 83 with a first input terminal and a second input terminal which are connected to the first and the second terminal of the resistor 9, respectively. An output of the first amplifier 80 and an output of the second amplifier 83 are connected to a logic unit 90. The logic unit 90 is connected to the control inputs of the four switches 10, 20, 30, 40. A means 84 for measurement of inductor current comprises the second amplifier 83 and the resistor 9.

A first terminal of a battery 1 is connected to the supply terminal 5 and a second terminal of the battery 1 is connected to the ground potential terminal 8. A capacitor 3 couples an output terminal 6 to the ground potential terminal 8. A resistor 4 which couples an output terminal 6 with the ground potential terminal 8 is representing the load which is driven by the DC/DC converter arrangement.

In an embodiment the first and the fourth switches 10, 40 may be designed as p-channel field-effect transistors and the second and the third switches 20, 30 may be designed as n-channel field-effect transistors. The function of the devices and elements shown in FIG. 1 is explained below together with FIGS. 2A to 2C.

FIG. 2A shows an exemplary embodiment of a control sequence having four switching phases A, B, C, D for a conversion in a buck-boost mode of operation. The switching scheme of FIG. 2A can be used with a circuit as shown in FIG. 1, for example. The first and the fourth switches 10, 40 are in an on-state during a first switching phase A with a second predetermined duration tp2. The second and the third switches 20, 30 are in an off-state during the first switching phase A. The first and the third switches 10, 30 are in an on-state during a second switching phase B with a first controllable duration td1, while the second and the fourth switches 20, 40 are in an off-state. The first and the fourth switches 10, 40 are in an on-state during a third switching phase C with a first predetermined duration tp1, while the second and the third switch 20, 30 are in an off-state. The second and the fourth switches 20, 40 are in an on-state in a fourth switching phase D with a second controllable duration td2, while the first and the third switches 10, 30 are in an off-state.

During the first switching phase A, a current IL through the inductor 2 flows from the supply terminal 5 to the output terminal 6. An output voltage Vout, provided to the output terminal 6, increases as the current IL charges the capacitor 3. During the second switching phase B, the current IL through the inductor 2 increases because energy is supplied to the inductor 2, while the second and the fourth switches are open and, therefore, the first terminal 60 of the inductor is directly connected to the battery 1 and the second terminal 61 of the inductor 2 is directly connected to the ground potential terminal 8. In the third switching phase C, the first and the fourth switches are closed so that the first terminal 60 of the inductor is connected to the battery and the second terminal 61 of the inductor is connected to the output terminal 6 while the second and third switches 20, 30 are open. During the fourth switching phase D, the current IL of the inductor 2 charges the capacitor 3, while the second and the fourth switch 20, 40 are closed. The switching phases A, B, C and D are repeated periodically with a cycle duration T. The switching phases A, B, C and D are realized in such a way that the DC/DC converter arrangement generates a stable output voltage Vout.

The battery 1 provides a supply voltage VB to the supply terminal 5. The capacitor 3 will be charged by the current IL of the inductor 2 and is used as an energy supply for a load of the DC/DC converter arrangement represented by resistor 4 in FIG. 1. The capacitor 3 supplies the output voltage Vout also in the phases in which the fourth switch 40 is open.

The voltage divider 81, 82 is used for generating a feedback voltage Vfb from the output voltage Vout. The first amplifier 80 compares the feedback voltage Vfb to the reference voltage Vref1 and provides a signal to the logic unit 90 as a function of the difference of the feedback voltage Vfb and the reference voltage Vref1. The current IL of the inductor 2 is measured by a means 84 for measurement of an inductor current IL comprising the resistor 9 and the second amplifier 83. The second amplifier 83 provides a signal SIL to the logic unit 90 as a function of the voltage difference at the first and the second input terminal of the second amplifier 83. This voltage difference is a voltage drop across the resistor 9 generated from the inductor current IL flowing through the resistor 9.

The logic unit 90 provides four control signals S1, S2, S3, S4 to control the four switches 10, 20, 30, 40 according to a control sequence. The four control signals S1, S2, S3, S4 are generated according to the table shown in FIG. 2A. Energy is provided from the battery 1 to the inductor 2 during the first, second and third switching phases A, B, C. Energy is provided by the inductor 2 to a load connected to the output terminal 6 during the first, third and fourth switching phases A, C, D.

It is an advantage of the DC/DC converter arrangement and the control sequence that the storage of energy in the inductor 2 and the supply of the energy from the inductor 2 to the output, including to the capacitor 3, can be controlled in a flexible manner.

As mentioned above, the second and the third switches 20, 30 are in an off-state and the first and the fourth switches 10, 40 are in an on-state during the third switching phase C. It is an advantage of this alternative embodiment that an energy loss can be reduced in the DC/DC converter arrangement during the third switching phase C.

FIG. 2B shows an exemplary control sequence for down-conversion using a buck operation mode of the DC/DC converter arrangement shown in FIG. 1. For down-conversion, the first and the fourth switching phase A, D, already described in the table in FIG. 2A, are preferably used. During the first switching phase A, energy is provided by the battery 6 to the inductor 2 and to a load connected to the output terminal 6. During the switching phase D, the battery 6 is decoupled from the inductor 2 and energy is provided to the output terminal 6 by the inductor 2 only.

Using this sequence, the output voltage Vout can be provided very efficiently. A supply voltage VB is used for the generation of the output voltage Vout whereas the supply voltage Vb is higher than a predetermined reference voltage Vref0 which is the predetermined value of the output voltage Vout. The reference voltage Vref1 equals the reference voltage Vref0 divided by a factor which is caused by the voltage divider 81, 82.

It is an advantage of the DC/DC converter arrangement according to FIG. 1 that it can also be used for down-conversion in buck mode of operation.

FIG. 2C shows an exemplary control sequence for up-conversion using a boost operation mode of the DC/DC converter arrangement shown in FIG. 1. The control sequence comprises two switching phases, the first switching phase A and the second switching phase B of the sequence shown in table in FIG. 2A. The two switching phases A, B are repeated periodically. During the second switching phase B, the first and the third switches 10, 30 are closed and, therefore, energy is supplied to the inductor 2 from the battery 1. In the following first switching phase A, energy is provided to the output terminal 6 from the inductor 2, because the first and the fourth switches 10, 40 are closed. The inductor current IL can flow to the capacitor 3 in the first switching phase A even if the output voltage Vout is higher than the supply voltage Vb.

In an embodiment, the control circuit 7 may be designed to select one operational mode of the set of the three operational modes described above by comparing the supply voltage Vb and the reference voltage Vref0, which is the predetermined value of the output voltage Vout.

It is an advantage of the DC/DC converter arrangement shown in FIG. 1 that it can be used for buck-boost operational mode, for buck operational mode, and for boost operational mode.

Figure 3:
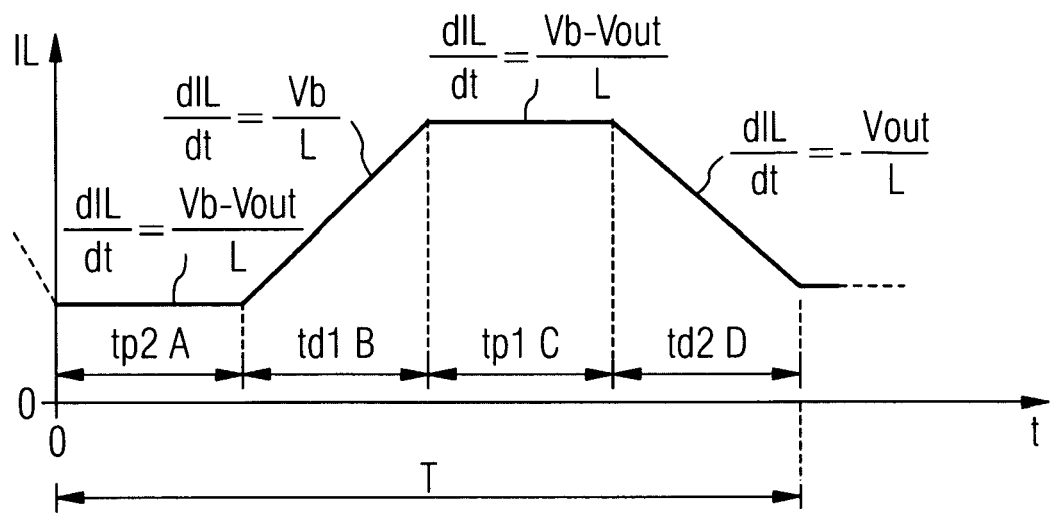
FIG. 3 shows an example of the inductor current during the four switching phases of a buck-boost operational mode.

FIG. 3 shows the inductor current IL schematically as a function of time t at an example. A complete cycle having a cycle time T is shown. The complete cycle comprises the first switching phase A lasting a second predetermined duration tp2, the second switching phase B lasting a first controllable td1, the third switching phase C lasting a first predetermined duration tp1, and the fourth switching phase D lasting a second controllable duration td2.

During the first switching phase A, the slope of the inductor current IL, that is the derivative with respect to time t of the inductor current IL, equals the voltage drop across the inductor 2 divided by the inductance L. The voltage drop across the inductor 2 is the value of the supply voltage Vb reduced by the value of the output voltage Vout in the first switching phase A. In the buck-boost mode, the output voltage Vout is in the same voltage range as the supply voltage Vb, and therefore, the slope is nearly zero during the first switching phase A. During the second switching phase B, the inductor current IL is rising with a slope which corresponds to the value of the supply voltage Vb divided by the inductance L. The inductor current IL is nearly constant in the third switching phase C because the slope of inductor current IL is the voltage difference between battery voltage Vb and output voltage Vout divided by the inductance L. The inductor current IL decreases in the fourth switching phase D because energy is supplied to the output terminal, including the capacitor 3. The slope of the decrease of the inductor current IL is defined by the negatived value of the output voltage Vout divided by the inductance L.

A value Vref0 of the predetermined voltage Vref0 can be approximately calculated using the following equations:

$$\frac{Vref0}{Vb} = \frac{td1 + tp1 + tp2}{td2 + tp1 + tp2}$$

and $$T = td1 + td2 + tp1 + tp2,$$

wherein Vb is a value of the supply voltage Vb provided at the supply terminal 6, td1 is a value of the first controllable duration td1, td2 is a value of the second controllable duration td2, tp1 is a value of the first predetermined duration tp1, tp2 is a value of the second predetermined duration tp2 and T is a predetermined cycle duration. If tp1 equals T/4 and tp2 equals T/4, wherein T is the duration of a cycle time, then Vref0 is controllable in a range defined by a lower level corresponding to half the supply voltage Vb and a higher level corresponding to double the supply voltage Vb by setting the appropriate values of td1 and td2.

Figure 4:
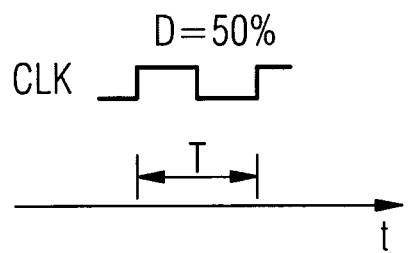
FIG. 4 shows a clock cycle.

FIG. 4 shows the clock cycle as a function of time t. The duty cycle is 50%. The duration of a cycle is the cycle time T.

Figure 5:
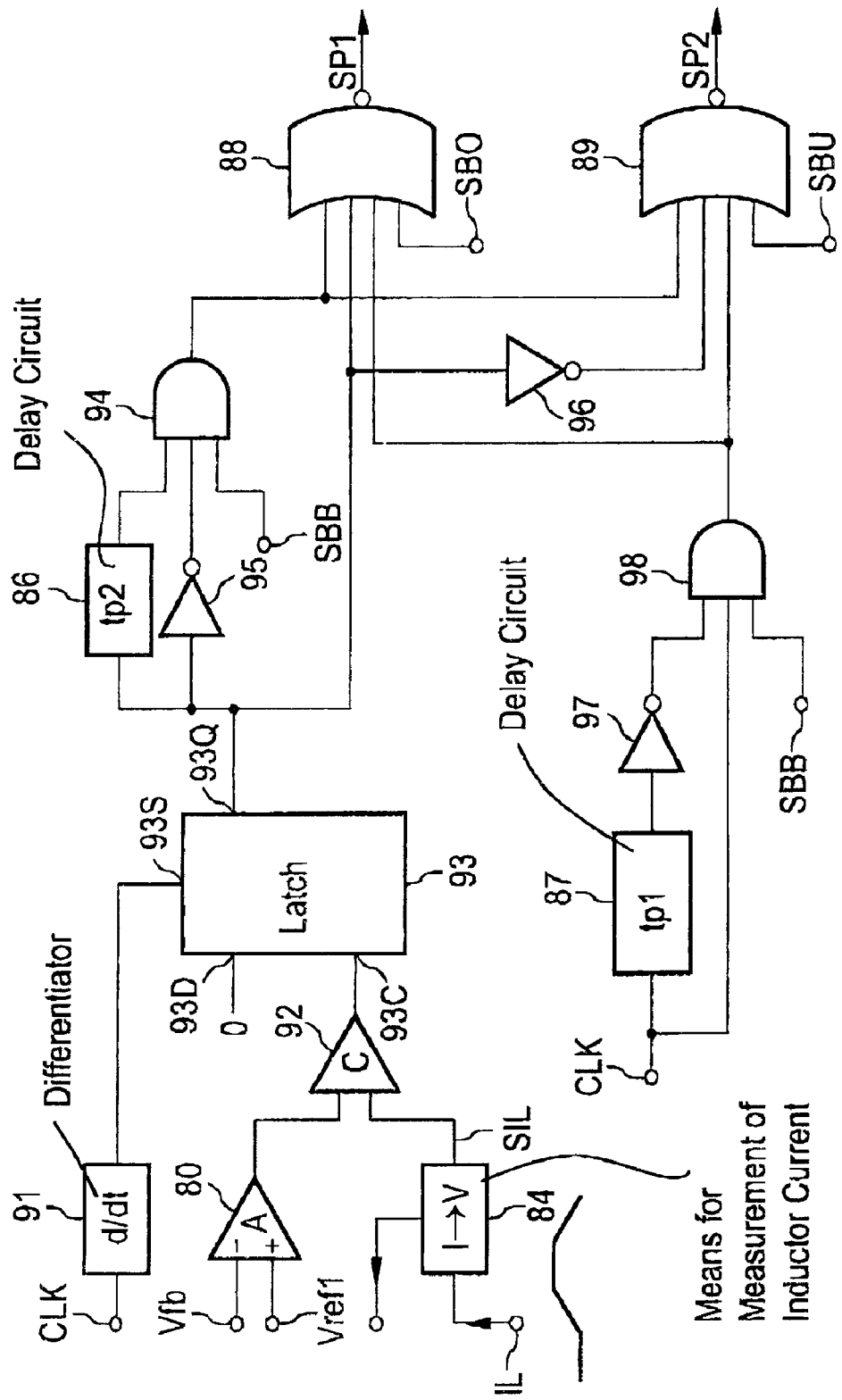
FIG. 5 shows a schematic of an exemplary embodiment of a control circuit of the invention.

FIG. 5 shows an exemplary embodiment of a control circuit 7 which can be used in a DC/DC converter arrangement as shown in FIG. 1. The control circuit 7 comprises several input terminals such as input terminals for the feedback voltage Vfb, the reference voltage Vref1, a clock signal CLK, an enable signal SBB for enabling the buck-boost mode of operation, an enabling signal SBU for enabling the buck mode of operation and an enabling signal SBO for enabling the boost mode of operation of the DC/DC converter arrangement. The control circuit 7 comprises a first amplifier 80 with two input terminals at which the feedback voltage Vfb and the reference voltage Vref1 are provided, respectively. A means 84 for measurement of an inductor current IL comprises an input and two output terminals. The current IL of the inductor 2 flows through one input terminal and one output terminal of the means 84 for measurement of an inductor current. A signal SIL is provided at the second output of the means 84 for measurement of an inductor current. The control circuit 7 comprises a comparator 92 with two input terminals which are connected to an output terminal of the first amplifier 80 and the second output terminal of the means 84 for measurement of an inductor current.

The control circuit 7 further comprises a differentiator 91 and a latch 93. The clock signal CLK is provided to an input of the differentiator 91. An output of the differentiator 91 is connected to a set terminal 93S of the latch 93. An output of the comparator 92 is connected to a clock terminal 93C of the latch 93. A reference voltage, preferable zero, is provided to an input terminal 93D of the latch 93.

The control circuit 7 further comprises a first delay circuit 86, an inverter 95, an AND-gate 94 and a first logic gate 88, which is designed as a NOR-gate. An output terminal 93Q of the latch 93 is connected to an input terminal of the first delay circuit 86 and to an input terminal of the inverter 95. The first delay circuit 86 is designed as a circuit with a delay for a falling edge by the second predetermined duration tp2. The AND-gate 94 comprises three input terminals, the first one of which is connected to an output terminal of the first delay circuit 86, the second one is connected to an output terminal of the inverter 95, and the third one is connected to the input terminal of the control circuit 7 at which the enabling signal SBB is provided.

The control circuit 7 further comprises a second delay circuit 87, an inverter 97, an AND-gate 98 and a second logic gate 89. The second logic gate 89 is designed as a NOR-gate. The second delay circuit 87 is designed as a circuit with a delay for a rising edge with the first predetermined duration tp1. An input terminal of the second delay circuit 87 is connected to the input terminal of the control circuit 7 to which the clock signal CLK is provided. The output of the second delay circuit 87 is coupled to an input terminal of the AND-gate 98 by the inverter 97. The AND-gate 98 comprises two further input terminals, one of which is connected to the input terminal for the clock signal CLK and another is connected to the input terminal of the control circuit 7 to which the enabling signal SBB is provided.

The first delay circuit 86 has a delay time which is equal to the second predetermined duration tp2 of the first switching phase A. The second delay circuit 87 has a delay time which is equal to the first predetermined duration tp1 of the third switching phase C. The first delay circuit 86 sets the second predetermined duration tp2. The second delay circuit 87 sets the first predetermined duration tp1.

The first logic gate 88 and the second logic gate 89 each comprise four input terminals. A first input terminal of the logic gate 88 is connected to an output terminal of the AND-gate 94. A second input terminal is connected to the output terminal 93Q of the latch 93, a third input terminal is connected to an output terminal of the AND-gate 98, and to a fourth input terminal of the logic gate 88 the enabling signal SBO is provided. The second logic gate 89 also comprises four input terminals, of which the first input terminal is connected to the output terminal of the AND-gate 94 and the second input terminal is coupled to the output terminal 93Q of the latch 93 via an inverter 96. The third input terminal is connected to the output terminal of the AND-gate 98. The enabling signal SBU is provided to the fourth input terminal.

The enabling signal SBB is high and the other enabling signals SBU, SBO are low in order to set a buck-boost mode of operation. The enabling signal SBO is high and the other enabling signals SBB, SBO are low in order to set a boost mode of operation, so that a signal SP1 provided at the output terminal of the first logic gate 88 is continuously low during a boost mode of operation. The enabling signal SBU is high and the other enabling signals SBB, SBO are low in order to set a buck mode of operation, leading to a signal SP2 at an output terminal of the second logic gate 89 which is continuously low during a buck mode of operation.

In an embodiment, the output terminal of the first logic gate 88 may be directly connected to the control input of the first and the second switch 10, 20, so that the signal SP1 is the control signal S1, S2. The output terminal of the second logic gate 89 may be directly connected to the control input of the third and the fourth switch 30, 40, so that the signal SP2 is the control signal S3, S4. This may be advantageous if the first and the fourth switch 10, 40 are designed as p-channel field-effect transistor and the second and the third switch 20, 30 are designed as n-channel field-effect transistor.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for DC/DC conversion, comprising the steps of:
controlling a first switch for coupling a supply terminal to a first terminal of an inductor;
controlling a second switch for coupling the first terminal of the inductor to a ground potential terminal;
controlling a third switch for coupling a second terminal of the inductor to the ground potential terminal;
controlling a fourth switch for coupling the second terminal of the inductor to an output terminal; and
performing a control sequence which comprises four switching phases, wherein
the first switch is in a closed switching position during a first, second and third switching phase and in an open switching position during a fourth switching phase,
the second switch is in a closed switching position during the fourth switching phase and in an open switching position during the first, second and third switching phase,
the third switch is in a closed switching position during the second switching phase and in an open switching position during the first, third and fourth switching phase, and
the fourth switch is in a closed switching position during the first, third and fourth switching phase and in an open switching position during the second switching phase,
wherein the first switching phase has a predetermined duration set by a first delay circuit, and the third switching phase has a further predetermined duration set by a second delay circuit.

2. The method according to claim 1, wherein the control sequence controls the first, the second, the third and the fourth switch and a maximum of two switches out of a set comprising the first, the second, the third and the fourth switch change their switching position at a respective transition of subsequent switching phases.

3. The method according to claim 1, wherein a maximum of one out of a subset comprising the first and the second switch is in the closed switching position in each of the switching phases and a maximum of one out of a subset comprising the third and the fourth switch is in the closed switching position in each of the switching phases.

4. The method according to claim 1, wherein each of the first, the second, the third and the fourth switch change their switching position at least once during a complete cycle comprising each of the switching phases.

5. The method according to claim 1, wherein the control sequence comprises:
the second switching phase having a first controllable duration,
the fourth switching phase having a second controllable duration,
the third switching phase having a first predetermined duration, and
the first switching phase having a second predetermined duration, wherein
an output voltage which is provided to the output terminal is a function of a value of the first controllable duration, of the value of the second controllable duration, of the value $tp1$ of the first predetermined duration, of the value of the second predetermined duration and of a supply voltage.

6. The method according to claim 5, wherein the value of the first controllable duration and the value of the second controllable duration are selected according to the equations:

$$Vref0/Vb=(td1+tp1+tp2)/(td2+tp1+tp2) \text{ and } T=td1+td2+tp1+tp2,$$

wherein $Vref0$ is a value of a predetermined reference voltage of the output voltage, $Vb$ is a value of the supply voltage provided at the supply terminal, $tp1$ is a value of the first predetermined duration, $tp2$ is a value of the second predetermined duration, and $T$ is a predetermined cycle duration.

7. A DC/DC converter arrangement, comprising;
a first switch for coupling a supply terminal to a first terminal of an inductor;
a second switch for coupling the first terminal of the inductor to a ground potential terminal;
a third switch for coupling a second terminal of the inductor to the ground potential terminal;
a fourth switch for coupling the second terminal of the inductor to an output terminal; and
a control circuit, which is coupled to
a control input of the first switch,
a control input of the second switch,
a control input of the third switch and
a control input of the fourth switch, and
wherein said control circuit is adapted for providing a control sequence which comprises four switching phases, wherein
the first switch is in a closed switching position during a first, second and third switching phase and in an open switching position during a fourth switching phase,
the second switch is in a closed switching position during the fourth switching phase and in an open switching position during the first, second and third switching phase,
the third switch is in a closed switching position during the second switching phase and in an open switching position during the first, third and fourth switching phase, and
the fourth switch is in a closed switching position during the first, third and fourth switching phase and in an open switching position during the second switching phase,
wherein the control circuit comprises a first delay circuit and a second delay circuit, the first delay circuit sets a predetermined duration of the first switching phase, and the second delay circuit sets a further predetermined duration of the third switching phase.

8. The DC/DC converter arrangement according to claim 7, wherein the control sequence controls the first, the second, the third and the fourth switch and a maximum of two switches out of the set comprising the first, the second, the third and the fourth switch change their switching position at a respective transition of subsequent switching phases.

9. The DC/DC converter arrangement according to claim 7, wherein the control circuit comprises a first differential amplifier having a first input terminal which is coupled to the output terminal, having a second input terminal to which a reference voltage is applied and having an output terminal to provide a signal which controls a timing of at least one of the transitions of the subsequent switching phases.

10. The DC/DC converter arrangement according to claim 7, wherein the DC/DC converter arrangement comprises means for measurement of an inductor current for controlling a timing of at least one of the transitions of the subsequent switching phases.

11. The DC/DC converter arrangement according to claim 10, wherein the means for measurement of the inductor current comprises a resistor which is connected to the inductor in order to provide a current measurement.

12. The DC/DC converter arrangement according to claim 11, wherein the means for measurement of the inductor current comprises a second differential amplifier having a first input terminal which is coupled to a first terminal of the resistor, having a second input terminal which is coupled to a second terminal of the resistor and having an output terminal to provide a signal which controls the timing of at least one of the transitions of the subsequent switching phases.

13. The DC/DC converter arrangement according to claim 7, wherein the first delay circuit sets at least one of a first and a second predetermined duration of the respective switching phase.

14. The DC/DC converter arrangement according to claim 7, wherein the first and the fourth switch each comprise a p-channel field-effect transistor and the second and the third switch each comprise an n-channel field-effect transistor.

15. The DC/DC converter arrangement according to claim 7, wherein the control circuit comprises a first logic gate having an output terminal which is coupled to the control input of the first and the second switch and a second logic gate having an output terminal which is coupled to the control input of the third and the fourth switch to provide a respective control signal to each control input.

* * * * *